(No Model.) 7 Sheets—Sheet 1.

J. SPIEL.
PETROLEUM AND GAS ENGINE.

No. 349,369. Patented Sept. 21, 1886.

Witnesses:
Chas S Woodroff
Robt. A. Blake.

Inventor.
Johannes Spiel.
per Phillipp & Leigh
Attorneys.

(No Model.)

J. SPIEL.
PETROLEUM AND GAS ENGINE.

No. 349,369.  Patented Sept. 21, 1886.

Witnesses.

Inventor.
Johannes Spiel.
per Phillips & Leigh
Attorneys.

(No Model.) 7 Sheets—Sheet 4.

J. SPIEL.
PETROLEUM AND GAS ENGINE.

No. 349,369. Patented Sept. 21, 1886.

Witnesses:
Chas. S. Woodroffe.
Robt. A. Blake.

Inventor:
Johannes Spiel,
per Phillipp & Leigh
Attorneys.

N. PETERS. Photo-Lithographer, Washington, D. C.

(No Model.) 7 Sheets—Sheet 5.

J. SPIEL.
PETROLEUM AND GAS ENGINE.

No. 349,369. Patented Sept. 21, 1886.

Witnesses.
Chas. S. Woodroffe
Robt. A. Blake

Inventor.
Johannes Spiel
per Phillipp & Leigh
Attorneys.

(No Model.) 7 Sheets—Sheet 6.

J. SPIEL.
PETROLEUM AND GAS ENGINE.

No. 349,369. Patented Sept. 21, 1886.

(No Model.)     7 Sheets—Sheet 7.

J. SPIEL.
PETROLEUM AND GAS ENGINE.

No. 349,369.  Patented Sept. 21, 1886.

Witnesses:
Chas. Woodroffe
Robt. A. Blake

Inventor
Johannes Spiel,
per Phillips & Leigh
Attorneys.

UNITED STATES PATENT OFFICE.

JOHANNES SPIEL, OF BERLIN, GERMANY.

PETROLEUM AND GAS ENGINE.

SPECIFICATION forming part of Letters Patent No. 349,369, dated September 21, 1886.

Application filed May 4, 1886. Serial No. 201,041. (No model.) Patented in England March 17, 1885, No. 3,414, and February 16, 1886, No. 2,272.

*To all whom it may concern:*

Be it known that I, JOHANNES SPIEL, a subject of the Emperor of Germany, residing at Berlin, in the Empire of Germany, engineer, have invented certain new and useful Improvements in Petroleum and Gas Engines, (for which I have received Letters Patent for the United Kingdom of Great Britain and Ireland, Nos. 3,414, March 17, 1885, and 2,272, February 16, 1886,) of which the following is a specification.

My invention relates to improvements in engines in which the motive power is produced by the combustion, under pressure, in the cylinder of the engine, of a mixture of a hydrocarbon gas or vapor with a due proportion of atmospheric air, pure oxygen or other gas, simple or compound, capable of supporting combustion, and is an extension of and improvement upon the invention for which I have petitioned for Letters Patent by my application filed April 6, 1885, and bearing the Serial No. 161,502.

The invention consists of improved devices for compounding the combustible mixture in proper proportions for effecting an intimate commingling of the hydrocarbon gas or vapor with the supporter of combustion; for delivering regulated charges thereof into the combustion-chamber of the engine-cylinder; for igniting them, and for governing the engine by intercepting the supply of combustible so soon as the velocity of the engine is likely to increase unduly.

This invention renders the ignition of the charge in the cylinder more certain, the pressures generated by the successive ignitions constant, or nearly so, and the action of the engine more regular. I attain these the several objects of my invention by the mechanisms illustrated in the following drawings, in which—

The foregoing figures represent an engine constructed according to my invention with its parts in the respective positions they occupy at the commencement of the stroke, four of which strokes (using the word "stroke" throughout this specification as meaning a travel of the piston from one end of the cylinder to the other) constitute one cycle of the motions of the engine.

Figure 1:
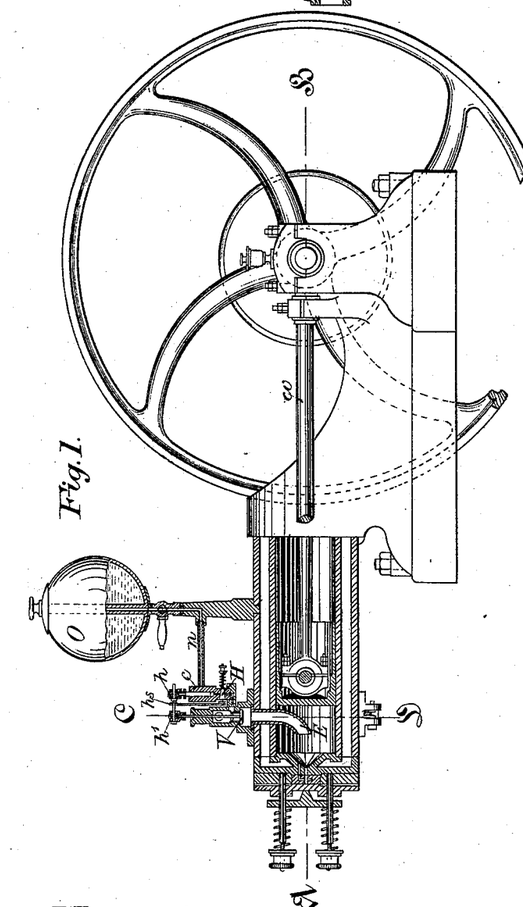
Figure 1 is a longitudinal elevation, partly in section.
Figure 2:
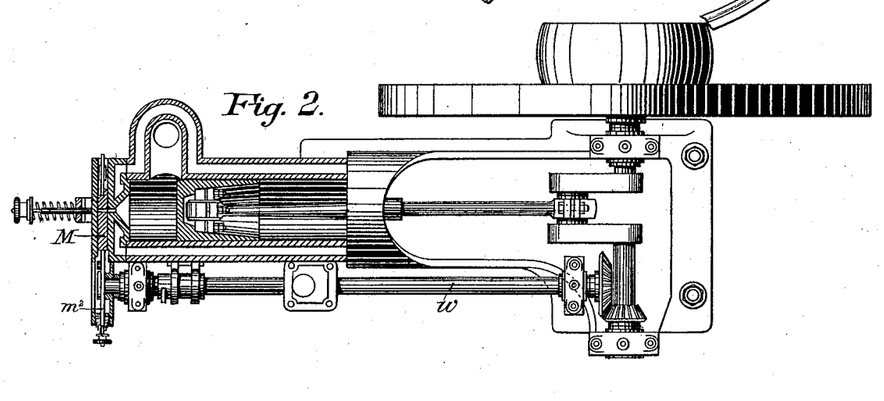
Fig. 2 is a plan, partly in section, taken on the line A B of Fig. 1.
Figure 3:
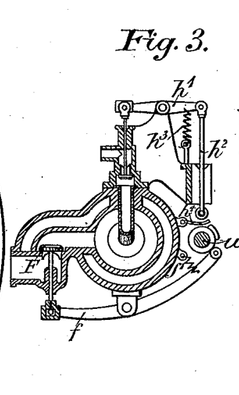
Fig. 3 is a transverse section through the air-valve cylinder and the exhaust, and is taken on the line C D of Fig. 1.
Figure 4:
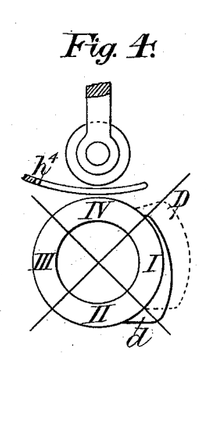
Fig. 4 is a diagrammatic elevation illustrating the cam-gear on the way-shaft for actuating the air-admission valve and the combustible-pump.
Figure 5:
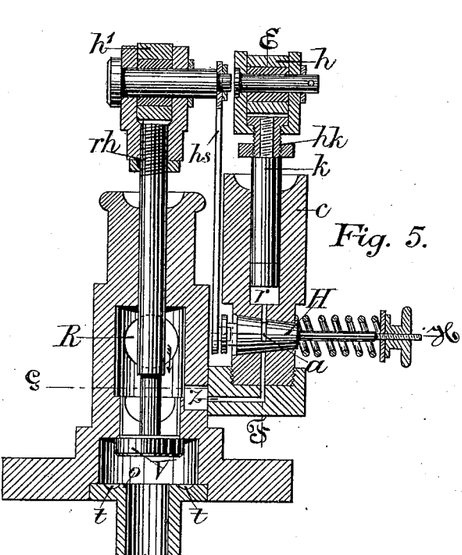
Fig. 5 is a sectional elevation through the axes of the air-valve cylinder and that of the combustible-pump, illustrating their construction in detail.
Figures 6, 9:
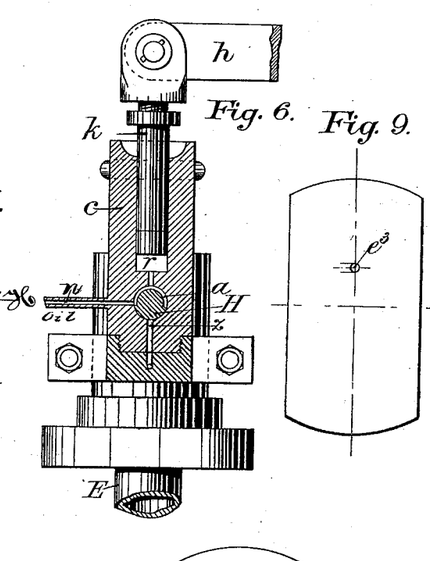
Fig. 6 is a transverse section through the axis of the combustible-pump, and is taken on the line E F of Fig. 5.
Fig. 9 is a plan of the inner face of the slide-cover.
Figure 7:
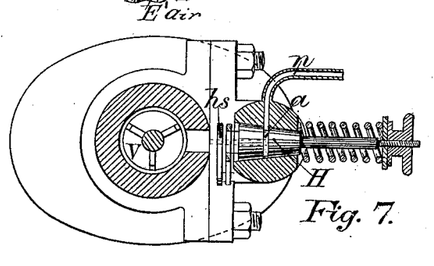
Fig. 7 is a plan taken on the line G H of Fig. 5.

The four strokes of one cycle perform, respectively, the following functions: During the first stroke (represented by the sector I of Fig. 4) a charge of explosive mixture is fed into the cylinder. The return-stroke II, Fig. 4, compresses the charge. When the dead-point is reached by the crank, the mixture is ignited, and the piston is driven through the third or working stroke, III, Fig. 4. During the next or fourth stroke, IV, Fig. 4, the piston drives the products of combustion out of the cylinder, whereupon a fresh cycle commences with the induction of a fresh charge of the combustible mixture into the cylinder. The combustible is drawn into the pump c by its plunger k, the downstroke of which drives it through the port z. This plunger is actuated by a cam-tappet, d, on the way-shaft w, through a link and a lever, h, in one direction, and in the other by a returning-spring, (as with the air-valve, as illustrated in Fig. 3.) The air-valve V is operated in a similar way—*i. e.*, by a second cam-tappet, D, on the way-shaft w, link h², and lever h' in the one direction, and by a returning-spring, h³, in the other. Both the above links are fitted with anti-friction rollers (to insure steady action) at their lower extremities, and anti-friction bars h⁴ are interposed between them and the cam-tappets, with the same view. The tappet d is so formed and fixed relatively upon the way-shaft that it can depress the plunger k, causing it to force the combustible inspired during its previous upstroke into the space r at the foot of the pump toward the cylinder of the engine, while the inducing-stroke of the working-piston is being made—i. e., the first stroke of a cycle, as the same has been defined above. The exhaust-valve F is raised at the proper moment to allow of the expulsion of the products of the explosion within the cylinder in the well-known way of actuating a lever, f, capable of opening the valve when depressed by a cam on the way-shaft, the lever being returned by a spring, f''. Beneath the pump c is a cock, H, which in one position places the pump in communication with the reservoir O, and in another position shuts off communication with the reservoir O and opens the way between the pump and the inlet-valve V. This cock is connected to and operated from the lever h' by the links h s, so that during the induction-stroke (represented by the division I, Fig. 5) the cock is in a position which permits the liquid in the pump to have access through the passage z to the space above the inlet-valve V, while at the same time the admission of liquid through the pipe n from the reservoir O is cut off. During the remaining strokes (represented by the divisions II, III, and IIII, Fig. 5,) the cock occupies such a position as to cut off the communication with the valve V, while the pump is again placed in the communication with the reservoir O. To enable the cock to fulfill the aforesaid functions, part of the circumference of the plug is formed with a channel, a, lying opposite the passages, which are alternately opened and closed by the rotation of the plug, as aforesaid. An adjusting screw and nut are provided at the junction h k of the plunger k with the lever h, so that the plunger can be set to increase or diminish the capacity of the space r. I do not confine myself to the form of pump c, as shown, as a modified form of apparatus might be used, the object being to obtain a means for using a fixed and ascertained quantity of combustible liquid for each explosion. The valve V is operated in a manner similar to the pump c by a lever, h'. The upper end of the spindle of the valve V is likewise provided with means r h for adjusting the lift of the valve V, so as to regulate the quantity of atmospheric air admitted through the pipe R, and which meets and mixes with the liquid entering through z. The air-supply is obtained through the pipe R. By allowing the valve V at its lowest position to approach to the lip O at the mouth of the pipe E to a requisite degree the delivery of air can be governed. To maintain the air and liquid longer together, and to give them time to mix, I extend the delivery-pipe E into the cylinder. The circular gutter t, formed round the mouth of the pipe E, serves to arrest any liquid that may be imperfectly mixed with the accompanying air, and as the explosive mixture flows over it and beneath the valve V the said gutter tends to direct the current upward, so as to break up and still further mix the air with the liquid, as it is desirable that the globules of liquid should be separated and held in suspension by the air when introduced into the cylinder. The valve V is operated by the cam D. (Shown in dotted lines.) When the cam comes beneath the lifting-link, the valve is lowered and held over the mouth of the pipe E at the adjusted distance.

The slide-valve and mechanism for effecting the ignition at the proper moment of the compressed explosive charge within the cylinder consist of an external lighting-flame, supplied from any suitable and convenient source, the slide-valve cover having a port in it through which the flame can gain access to the igniting-port in the slide, the slide-valve gearing with the way-shaft, by which it is caused to make a forward stroke between the cover and the cylinder end, a spring device for effecting the rapid return-stroke of the valve, and ports in the cylinder communicating with corresponding ports in the slide-valve.

Figure 8:
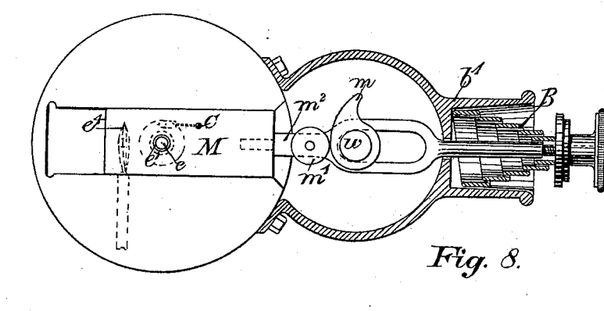
Fig. 8 is an end elevation of the cylinder end, slide-valve, and cam and spring mechanism for operating the latter.
Figure 14:
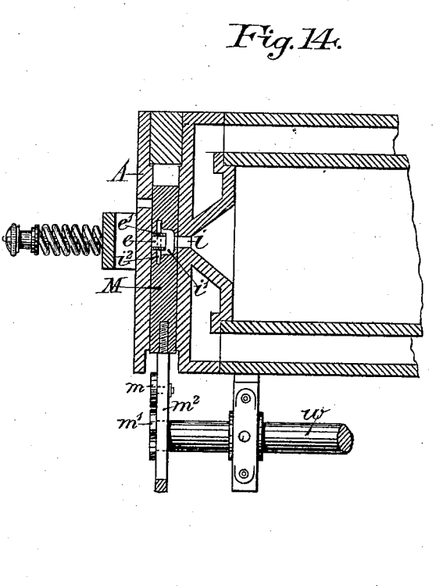
Figure 16:
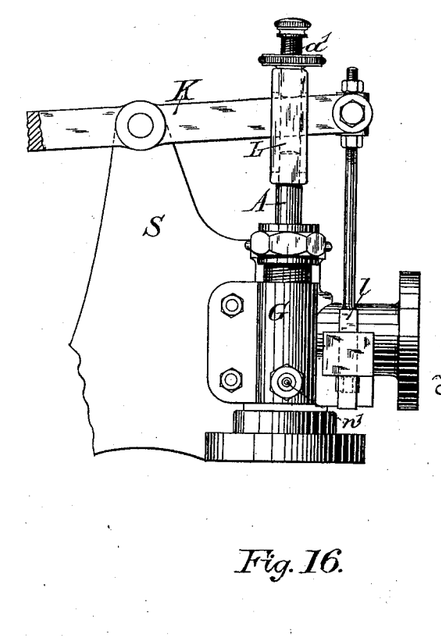
Fig. 16 is a front elevation.
Figure 17:
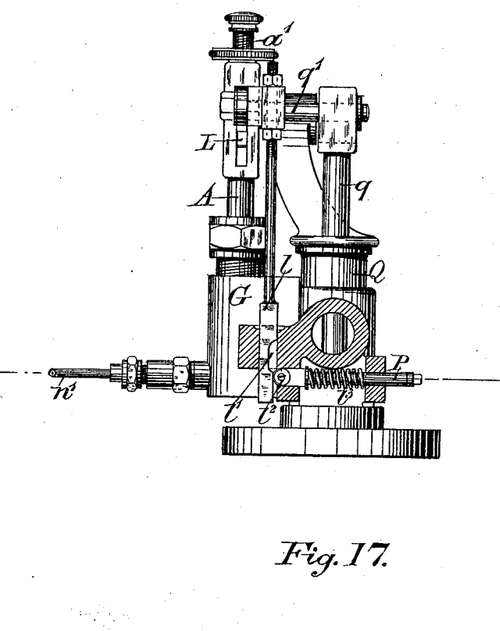
Fig. 17 is a side elevation, partly in section.

The ignition of the charge within the cylinder is effected in the following manner: Just before the piston has completed the first stroke of a cycle the cam m on the way-shaft, which is geared to make only one revolution to two of the crank-shaft, bears against the roller m', carried by the valve-rod m². The valve M is accordingly driven outward till the lighting-port e coincides with the port e³ in the valve-cover A'. During this stroke of the slide-valve communication between the contents of the cylinder and those of the cavity in the slide is maintained by the special construction of ports now to be described. In the center of the cylinder end I form a port, i, through which, while the slide-valve is in the position illustrated in Fig. 8, combustible mixture can flow into its main cavity. The cavity in the slide is circular in transverse section, and is of three diameters, as shown clearly in Fig. 14. That part of the cavity facing the cylinder end is of the same diameter as the port i. The cavity is then enlarged to about double the diameter of i, forming the chamber i', which in its turn is enlarged into the narrow annular chamber i², communicating with a lateral port, i³, formed in the slide in a line parallel with the axis of the port e. A short tube, e', is screwed into the face of the valve, and is long enough to pass through i² and half-way (about) into i'. Above the port i, in the cylinder end, I form a smaller port, i⁴, to coincide with i³. The bore of the tube e' is the same as the diameter of the ports e³ or i. The end of the port i³ next the cylinder is expanded into a channel, $i^5$, formed on the inner face of the slide, this channel suddenly narrowing into a mere slit, which terminates in a small conical cavity, $i^6$. As the combustible mixture is fed into the cylinder it fills the cavities in the slide, and as the latter is moved outward by the cam $m$, as described above, the pressure obtaining in the cylinder is maintained in the chambers $i'$ and $i^2$. As soon as the port $e$ of the slide-valve coincides with the port $e^3$, the lighting-flame $e^4$ enters the port $e$ and ignites the mixture there and in the chamber $i'$. The supply of fresh combustible mixture from the cylinder is kept up during the return-stroke of the slide-valve through the before-described line of communication. The temperature of this supply is considerably increased by its flowing over the outer surface of the tube $e'$, and its ready ignition in the chamber $i'$ facilitated thereby.

The return-stroke of the slide-valve is effected by means of a strong spiral spring, B, compressed by the outstroke of the slide between an adjustable collar on the valve-rod and the spring-box $b'$, the spring being free to act the moment the cam $m$ has passed the roller $m'$. The comparatively slow motion of the slide before the cam is in strong contrast with its rapid return in obedience to the resilient action of the spring B, and it is to this quick return that the retention of ignition in the port $e$ is rendered possible at the moment the latter is being dragged away from $e^3$.

Figures 10, 11, 12:
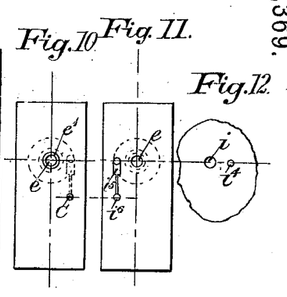
Fig. 10 is a plan of the outer face of the slide-valve.
Fig. 11 is a plan of the inner face of the slide-valve.
Fig. 12 is plan of the cylinder end.
Figures 13, 15:
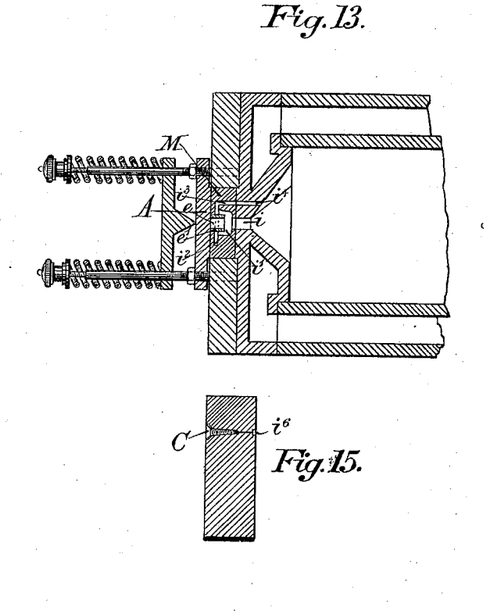
Figs. 13 and 14 are respectively sectional elevation and plan of the slide-valve and parts adjacent, and are taken through the axis of the cylinder.
Fig. 15 is a transverse section through the slide-valve, illustrating the operation of the regulating-screw.

It is of very great importance to the satisfactory operation of the above-described igniting apparatus that the narrow slit on the inner face of the slide, and connecting $i^5$ and $i^6$, should be made and set with the greatest precision. The drawings (Figs. 10 and 11) represent it intentionally exaggerated. In practice it looks a mere line. For the purpose of securing a correct adjustment of this slit, I provide the slide with an adjusting-screw, C, working through the outer face of the slide, as shown in Fig. 15. A slight turn of the screw forward widens this slit, while a corresponding and reverse movement allows the sides of the slit to approximate.

I will now describe a modification of the combustible and air-supply mechanism described above, and illustrated therewith, according to which the spindle of the air valve or pump and the plunger of the combustible-supply pump are both connected to a lever actuated in one direction by a tappet on the way-shaft $w$ and in the other by a returning-spring. The essential parts of this modification are as follows: $a$, the measuring and supply mechanism with its special valves; $b$, the air-suction valve, in the chamber of which the combustible is mixed with its proper quantity of air, and communication between which and the measuring mechanism is through an impeded port; $c$, the mechanism for actuating the special valves above mentioned.

The figures illustrate the relative positions of the various parts shown in the last-mentioned five figures at the moment when the plunger A is at the top of its stroke, having, therefore, just completed the inspiration into the pump G of a charge of combustible gas or petroleum, as the case may be, through the supply-pipe $n'$, the suction-valve $g$ and the delivery-valve $g'$ being kept, the former open and the latter shut, by the spring $j$. So soon as the end of the lever K, actuated by the link $k'$ and passing through a slot, L, in the top of the plunger A, is depressed by the cam on the way-shaft, the slide $l$, which up to that moment was keeping the nose $p$ of the elbow P in contact with the valve spindle $p'$, is likewise depressed, the recess $l'$ being brought oppsite to the roller $l^2$, which is consequently forced into the recess by the spring $l^3$, and the adjustable nose of the elbow pulled against the valve-spindle $p'$. The latter transfers the pressure to the delivery-valve $g$, opening the former, shutting the latter, and compressing the spring $j$ (which is proportionally weaker than the spring $l^3$) accordingly. Such are the means by which, according to the modification of supply-gear now being described, the communication between the supply of combustible and the delivery-port $g^3$ is suspended, and one between the latter and the cavity above the valve V opened. The slot in the top of the plunger A, through which the lever K reaches the top of the slide $l$, is deep enough to permit of the above-described movements being performed without the piston of the pump being moved; but so soon as the slide $l$ has been depressed for a proper distance (it is provided, as shown, with a suitable adjusting device, $a'$) the continued descent of the lever K forces the plunger A down, and it consequently drives the charge of combustible through the port $g^3$, and past the valve V into the ignition-chamber of the engine.

Q is the air pump or supply, $q$ its valve-spindle, and $q'$ a cross-head by which it is connected to the lever K.

S is a bracket standing crosswise of the engine-cylinder, by which the before-described modification is carried. It is obvious that a charge—say of petroleum—in course of injection toward the ignition-chamber of the engine from the bottom of the pump G, cannot pass in mass through the port $g^3$, but must assume the section of, approximately, a thin tube, because of the fluted or webbed pin $g^2$ lying between the valves $g$ and $g'$, and touching both. The further passage of the petroleum toward the valve-cavity N is obstructed by the valve $g'$, the end of the spindle $p'$, and, lastly, by the conical ring $g^4$. The result is, that the petroleum falls upon the valve V in the condition of a fine spray, and therefore capable of making automatically a perfect admixture with the air of combustion supplied from the air-supply Q. The number of webs $g^5$ shown in the figures is four, their function being simply to support the pin $g^2$ longitudinally in the center of the port $g^3$, and their number therefore variable. The return—i. e., rise—of the lever K takes the slide $l$ up with it. The elbow P is returned to its former position, at the same time taking the nose $p$ off the valve-spindle $p'$, whereupon the spring $j$ shuts the valve $g'$ and opens the suction-valve $g$. The plunger A then makes another stroke, drawing in a fresh supply of combustible. It is evident that the length of the stroke which the plunger A is capable of making decides the quantity of combustible supplied. The plunger is therefore furnished with an adjusting device, $a'$, by means of which the depth of the slot L can be adjusted.

Figure 18:
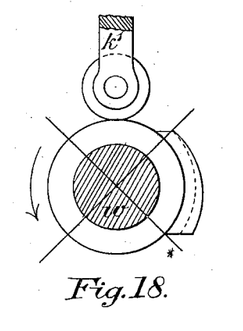
Fig. 18 is a diagrammatic elevation of the cam-gear on the way-shaft, and the end of the lever-link $k'$ fitted with an anti-friction roller.
Figure 19:
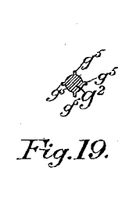
Fig. 19 is a transverse section of the pin lying in the obstructed port.

The shape of the cam illustrated in Fig. 18 is decided by the necessity of actuating the valves $g$ and $g'$ with a short quick stroke, in order that the charge of combustible may be injected through the port $g^3$ equally during the duration of the stroke of the working-piston.

Figure 20:
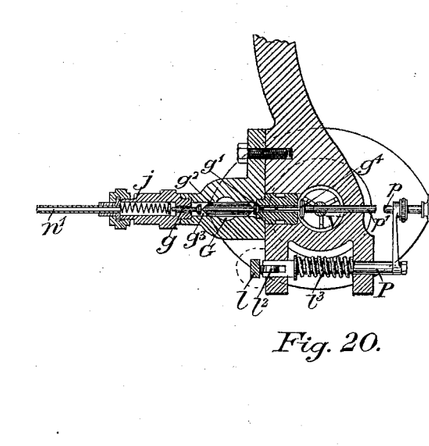
Fig. 20 is a sectional plan, taken on the line I J of Fig. 17.
Figure 21:
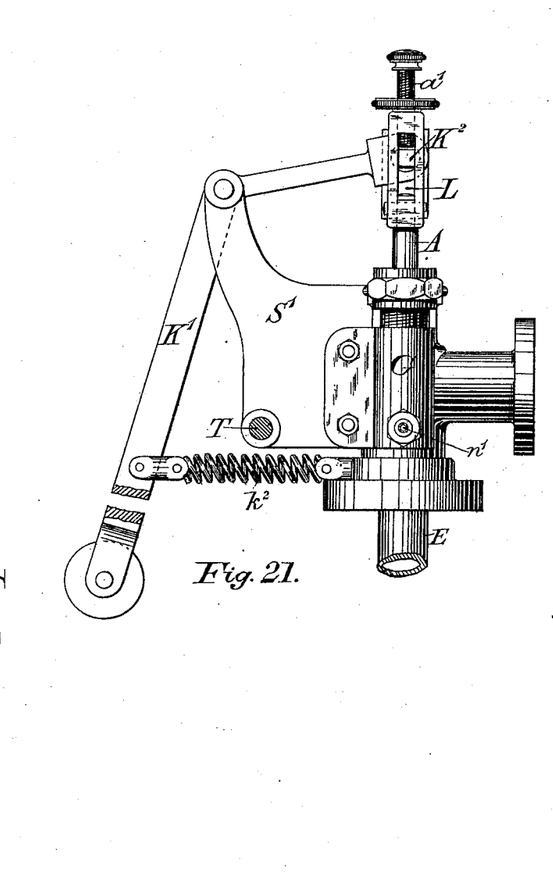
Fig. 21 is a front elevation.
Figure 22:
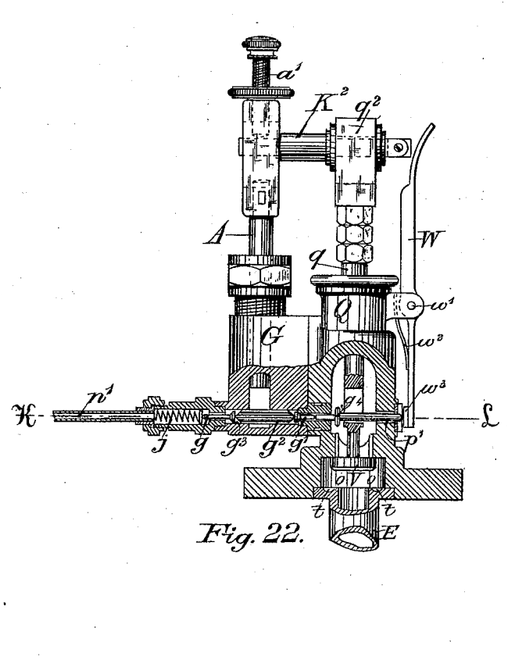
Fig. 22, an elevation, partly in section, taken from the fly-wheel side of the engine.
Figure 23:
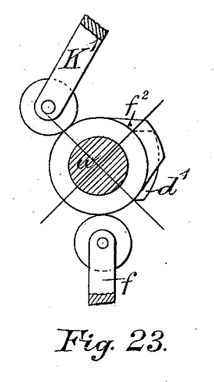
Fig. 23 is a diagrammatic end elevation of the cam-gear for working the lever. The cam for working the exhaust-valve lever is introduced into this figure, and is the same as that used with the before-described gear.

It is evident that a gas or petroleum engine fitted with the above-described supply-gear can be readily governed by gearing the governor to the short arm of the elbow P, so as to pull the latter more or less to one side away from the spindle $p'$ as the speed of the engine rises, and to push it back again as the speed of the engine falls. The short arm is made movable upon the long arm for this purpose, as indicated in Fig. 20. Whenever the nose $p$ misses the valve-spindle $p'$, the next charge of combustible would be forced back along the supply-pipe $n'$.

Figs. 21 to 25 illustrate, essentially, the same supply-gear as the one last described, but combined with an improved and compact governing device. Where the parts are the same as those illustrated in Figs. 16 to 20, the same reference-letters are used.

K' is a lever pivoted on a bracket, S', standing transversely upon the cylinder. It is actuated in one direction by the cam-tappet $d'$ upon the way-shaft $w$, and in the other by the spring $k^2$. The exhaust-lever $f$ is actuated by the cam-tappet $f^2$. It will be noticed that the tappets are shorter than those illustrated in Fig. 18.

A is the combustible-pump plunger working in the cylinder G.

L is the slot in the head of the plunger, and $a'$ the adjusting device.

Q is the cylinder of the air-supply, $q$ the valve-spindle, V the valve, E the pipe leading to the engine-cylinder, $o$ the lip thereof, and $t$ the annular gutter. The four last-mentioned parts are common to all the supply mechanisms illustrated with this specification. The air-valve spindle $q$ terminates in a stout adjustable head, $q^2$, to which the end of the lever K' is rigidly connected.

$K^2$ is a cross-head, also connected rigidly to the head $q^2$, its other end sliding in the slot L in the head of the plunger A.

The supply-pipe $n'$, spring $j$, valves $g$ and $g'$, pin $g^2$, and port $g^3$, conical ring $g^4$, and valve-spindle $p'$ have been already described with reference to Figs. 16 to 20, and the operation and mutual relationship of the parts already mentioned with reference to Figs. 21 to 24 are clear from the foregoing description. The bracket S' corresponds with the bracket S of Fig. 16, the lever K' with the lever K of Figs. 16 and 17, and the tappets $d'$ and $f^2$ with those of Fig. 18.

Figures 24, 25:
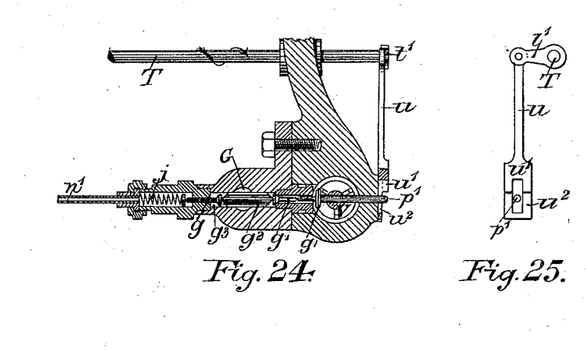
Fig. 24 is a plan in section, taken on the line K L of Fig. 22.
Fig. 25 is an elevation of the stop-slide and the link which connects it to the governor-gear.

T is a light horizontal rod capable of a partial rotation in suitable bearings. It is connected with the governor of the engine in any convenient way, so that an increase in the speed will move it around its axis in the direction of the arrow. One end carries a small link, $t'$, fast thereon, the outer extremity of which is pivoted to the end of the stop-slide $u$. The wide end of this slide rides against the side of the cylinder A, which is shaped at the point to receive it properly. Part of the wide end $u'$ of the stop-slide is as thick as the projection of the valve-spindle $p'$. The other half $u^2$, is not more than half as thick as the part $u'$. The projection of the valve-spindle $p'$ beyond the thin part $u^2$ is equal to the distance traveled by the valves $g$, $g'$, or $g^1$, or the pin $g^2$.

W is a lever pivoted at $w'$, and pressed outward by a spring, $w^2$, so as to keep the extremity $w^3$ clear of the end of the valve-spindle $p'$. The descent of the cross-head causes its end to bear against the upper end of the lever W and drive the valve-spindle $p'$ in, opening the valve $g'$, closing the valve $g$, moving the ring $g^1$ inward, and compressing the spring $j$. This motion permits of the injection of the combustible onto the valve V, and so on into the engine. When the speed of the engine rises too high, the slide $u$ is pushed forward over the projecting end of the valve-spindle $p'$ until the thick part $u'$ comes between the end $w^3$ of the lever and the face upon which the end of the slide works, thereby preventing the lever end from striking the end of the spindle $p'$ as the cross-head descends. The pliability of the lever W prevents it being distorted. As soon as the speed of the engine falls, the slide $u$ is drawn outward and the valves are operated again, as previously described.

I claim—

1. In a gas or hydrocarbon-vapor engine, the measuring and mixing mechanism, actuated in any convenient way, consisting of a plunger working in a cylinder, through the end of which works a plug having a channel cut half-way round its central part, and which plug is worked with a reciprocating rotary motion to open as the plunger descends and the working-piston of the engine makes its first stroke, and of an air-valve opened at the same time, in combination with a mixing-space under the said air-valve, a bent pipe leading therefrom into the ignition-chamber of the engine, the top end of which is surrounded by an annular gutter, substantially as and for the purpose described with reference to the accompanying drawings.

2. In the slide of a gas or hydrocarbon-vapor engine, which is traversed to and fro between an external lighting-flame and a face formed upon the cylinder, and against which it is held in any convenient way, the combination of a port in the cylinder, through which combustible mixture can pass into a chamber in the valve as the valve starts on its outstroke, into which projects a short tube from the outer face of said slide, leaving a circular space in front of it of like diameter, and an external annular space round it, to which combustible mixture is fed during the outstroke and return-stroke of the valve through a small port in the cylinder opening into a horizontal shallow channel (part of which is only a slit) in the cylinder-face of the slide, said channel being of the length of the stroke of the slide, and thence along a port in the body of the slide opening into the external annular space aforesaid, with a spring device for effecting a rapid return-stroke, substantially as described with reference to the accompanying drawings.

3. In the slide-valve of a gas or hydrocarbon-vapor engine for igniting a high-pressure charge of combustible within the engine-cylinder, the combination, with a narrow slit in the cylinder-face of said slide, which slit forms part of a channel for the feed of combustible mixture from the engine-cylinder to the cavity in the body of the slide, of a transverse screw in the solid part of the slide, and having its nose close to the slit, whereby the width of the said slit can be increased by advancing the nose of the screw, and allowed to narrow by withdrawing the screw, substantially as and for the purpose described with reference to the accompanying figures.

4. In a gas or hydrocarbon-vapor engine, the combination of an injection-pump for supplying the combustible in measured quantity, an air-valve for allowing of the passage of air, both pump and valve being actuated by a lever connected to the latter, and working in a slot of adjustable depth in the head of the pump-plunger, with a supply and a delivery valve upon the delivery-port of the pump, said port being impeded or obstructed with a fluted or webbed pin, which, with a conical obstruction opposite the end of the delivery-port, breaks up the combustible into a fine spray as it is being injected into a cavity into which the air is admitted just before the air-valve is opened to allow the combustible mixture to pass on into the ignition-chamber of the engine, substantially as described with reference to the accompanying drawings.

5. In a gas or hydrocarbon-vapor engine, the combination of reciprocating slide bearing a transverse cavity in its end, into which a spring pushes a rod when said cavity is opposite the end of said rod, the other end of which is thereby compelled to open the delivery-valve and close the supply-valve on the delivery-port of an injection-pump, with the lever operating the plunger of said pump and the air-supply valve of the engine, substantially as described with reference to the accompanying drawings.

6. In a gas or hydrocarbon-vapor engine, the combination of the port along which the combustible passes to meet with its quota of atmospheric air or other supporter of combustion, with a fluted or webbed pin lying therein, and leaving only a thin approximately tubular space between itself and the bore of the port, thereby compelling the combustible to assume the form of, approximately, a thin tube, with a conical valve opposite the exit end of said port, which breaks up the thin tube of vapor into fine spray as it is mixing with said atmospheric air or other supporter of combustion, substantially as described with reference to the accompanying drawings.

7. In a gas or hydrocarbon-vapor engine, the combination of an injection-pump for supplying the combustible, with a valve for allowing the passage past it of the combustible and air, and controlling the passage into the cylinder of the engine, both actuated by a cross-head rigidly connected to the head of the air-valve spindle and working freely in an adjustable slot in the head of the pump-plunger, substantially as described with reference to the accompanying drawings.

8. In a gas or hydrocarbon-vapor engine, governing the engine by a governor geared to a slide which surrounds the projecting end of a valve-spindle and prevents a lever from pushing it in to open the combustible-delivery valve when the speed of the engine increases, and which slide is withdrawn by the governor as it regains its normal speed, substantially as described with reference to the accompanying drawings.

In testimony whereof I, the said JOHANNES SPIEL, have hereunto set my hand this 9th day of April, 1886.

JOHANNES SPIEL.

Witnesses:
W. JAS. S. KERBER,
  17 Gracechurch St., London, E. C.
G. F. WARREN,
  Notary Public, London.